(12) United States Patent
Stegmaier et al.

(10) Patent No.: US 6,753,759 B2
(45) Date of Patent: Jun. 22, 2004

(54) METHOD FOR OPERATING A TRANSPONDER

(75) Inventors: Peter Stegmaier, Ponte Capriasca (CH); Parvis Hassan-Zade, Morcote (CH)

(73) Assignee: Datamars SA, Bedano-Lugano (CH)

( * ) Notice: Subject to any disclaimer, the term of this patent is extended or adjusted under 35 U.S.C. 154(b) by 367 days.

(21) Appl. No.: 09/762,674

(22) PCT Filed: Dec. 7, 2000

(86) PCT No.: PCT/CH00/00650

§ 371 (c)(1),
(2), (4) Date: Feb. 9, 2001

(87) PCT Pub. No.: WO01/43065

PCT Pub. Date: Jun. 14, 2001

(65) Prior Publication Data

US 2002/0135478 A1 Sep. 26, 2002

(30) Foreign Application Priority Data

Dec. 7, 1999  (CH) .............................................. 2243/99

(51) Int. Cl.[7] ................................................ H04Q 5/22
(52) U.S. Cl. ................. 340/10.51; 340/10.5; 340/10.52
(58) Field of Search ............................. 340/10.51, 10.5, 340/10.52

(56) References Cited

U.S. PATENT DOCUMENTS 4,567,473 A * 1/1986 Lichtblau
5,710,540 A * 1/1998 Clement et al. ............ 340/572
5,774,065 A * 6/1998 Mabuchi et al. ....... 340/825.72

FOREIGN PATENT DOCUMENTS

| EP | 0 682 425   | 11/1995 |
| JP | 01 251937   | 10/1989 |
| WO | WO 98 13805 A | 4/1998 |
| WO | WO 99 05658 A | 2/1999 |

* cited by examiner

Primary Examiner—Michael Horabik
Assistant Examiner—M Shimizu
(74) Attorney, Agent, or Firm—Weingarten, Schurgin, Gagnebin & Lebovici LLP

(57) ABSTRACT

A transponder includes a data memory and a mechanism for contactless interaction with a base station. The transponder is brought (1) into an active field of the base station. Before the transponder is deactivated (7) by the base station by the transfer of a command signal (5), the authorization of the base station for deactivation (7) is checked (4). Before the transfer of the command signal (5) an admission signal which contains first admission information is transmitted (3) from the base station to the transponder. The first admission information with second admission information stored in the data memory is processed by the transponder into authorization information. Based on the authorization information it is decided (4) whether the command signal is accepted (7) or rejected (8). Thus the transponder while keeping secret the data present in the transponder may be reliably deactivated (7) or reactivated.

14 Claims, 2 Drawing Sheets

METHOD FOR OPERATING A TRANSPONDER

BACKGROUND OF THE INVENTION

The present invention relates to a method for operating a transponder.

Nowadays transponders are offered in various embodiment forms. For various applications passive transponders, also called identification tags or tags are used. These serve the identification of objects as well as also for security from theft.

Passive transponders for security from theft are for example fastened on pieces of clothing. Such tags are known as EAS tags (electronic article surveillance). These consist for example of a coil and of a capacitance which together form a resonant circuit. From a base station (also called read apparatus) the resonant circuit is excited into oscillation and its answer signal is detected. Thus the presence or the absence of a transponder may be ascertained, transponders with differing resonance frequencies may be differentiated from one another On purchase the transponder is inactivated in order with objects which leave the place of purchase to render possible the differentiation between "paid" and "not paid" and in the case of the latter for an alarm to be made. For the inactivation it is sufficient to create a significant change in the resonant circuit. Such a change may for example lie in shorting the coil or destroying the resonance capacitor. Also by way detuning the resonant circuit or by way of other irreversible measures the transponder may be inactivated.

For the sake of clarity it is to be mentioned here that one in principle must differentiate between to inactivate and to deactivate. With the inactivation the transponder is brought into a condition in which it is irreversibly no longer capable of operation. To deactivate is in contrast to be understood as reversibly bringing the transponder from an active status into and idle status in order when desired to bring it again into the active status.

Furthermore there are known transponders which function with an emitter which is activated in a read field of a base station and data is transferred to the base station. Such RF-ID (Radio Frequency IDentification) transponders are somewhat more complex and comprise mostly two main elements, specifically an integrated circuit board and an antenna. The RF-ID transponders may be deactivated by way of the transfer and storing of suitable data. If the deactivated integrated circuit board is inquired by a base station then it will no longer transfer any data to the base station.

In the document JP-01 251 937 A there is disclosed a method which is to ensure that a signal transmitted from a first transfer station is received by a second transfer station. If from the second transfer station there is received a signal then this answers with a repeated sending of a confirmation signal to the first transfer station. By way of the repeated sending it is ensured that the confirmation signal also with a difficult or disturbed transfer reaches the first transfer station, by which means there is achieved a secure communication.

From the document WO 99/05658 Al there is known a method for operating an RF-ID transponder, according to which to each transponder belonging to a base station there is allocated unambiguous identification information. This identification information is stored in the transponder as well as in a database which may be called up by the base station. As soon as the base station has ascertained a transponder in its active field, it inquires its identification information and compares this to the information stored in the database. Only when the identification information agrees does the base station transmit a deactivation command to the transponder. By way of this the base station ensures that it only deactivates those transponders which are allocated to it. With this method however it may not be prevented that a transponder is deactivated and reactivated in an unauthorized manner; the transponder accepts in every case a command signal sent from the base station.

A problem results e.g. with the EAS transponders as well as with the RF-ID transponders, in the case that the purchased good with the inactivated or deactivated transponder again comes back to the sales location, e.g. for the purpose of exchange. In this case the transponders must again be activated, e.g. to control the flow of goods. With inactivated EAS tags this is usually not possible; the resonant circuits which have been irreversibly destroyed or inactivated with the sale may not be reactivated.

RF-ID transponders behave in a different manner. Most of these transponders may be reactivated. For this the RF-ID transponder is brought into the transmitting range of the read apparatus and by way of a suitable activation signal is again transposed into the active condition. Problematic is however the fact that such RF-ID transponders may be deactivated and reactivated by any one at any time if the corresponding command signal is known. Since the identification signal is freely transferred from the base station to the transponder, it may be determined without any problem by which means there is no longer any protection. The unauthorised deactivation must not be possible because this makes theft possible. The unauthorised reactivation is undesired for reasons of protection of the person. Inactivated transponders should under no circumstances be reactivated in an unauthorised manner and be able to be used for following the marked goods respectively their owner.

It is the object of the present invention to put forward a method with which transponders are reliably deactivatable respectively reactivatable only by suitably authorised base stations and their operators.

BRIEF SUMMARY OF THE INVENTION

This object is achieved by a method that ensures that the deactivation signal/reactivation signal respectively is not accepted before the authorization of the base station for the deactivation/reactivation respectively is checked. This checking is carried out by the transponder by way of an admission signal from the base station.

According to the invention the transponder comprises a data memory and means for the contactless, in particular electrical, magnetic or electromagnetic interaction with a base station. The transponder is brought into an active field of the base station and by the base station is deactivatable respectively activatable by way of the transfer of a command signal. Before the deactivation respectively activation of the transponder the authorisation of the base station for deactivation respectively reactivation is checked in that from the base station before the transmission of the command signal, an admission signal which contains first admission information is transferred to the transponder, the admission signal is received by the transponder and the first admission information with second admission information stored in the data memory by the transponder is processed into authorisation information. On account of the thus obtained authorisation information in the transponder it is decided whether the command signal is accepted or rejected. In the first case the transponder may be deactivated respectively activated.

In contrast to the above discussed method known from the state of the art the method according to the invention functions with a mere one-sided transfer. In the simplest embodiment form only the base station sends signals to the transponder, and in contrast does not require an answer from the transponder. For this reason the method according to the invention is simple and reliable.

As a first and second admission information preferably at least one secret key which is not publically accessible is used. The method according to the invention may use asymmetrical keys and suitable computation rules. In this case e.g. in the base station there is present a "public key" and in the transponder a "private key".

It may be advantageous when the base station and the transponder in the active condition also before the exchange of the admission signals may exchange protected data.

Also when the transponder is located in the read field of the base station there may occur transmission malfunctioning. It may therefore be advantageous when the base station, after sending the command signal which sets the transponder in the idle status, emits a control signal which would be answered by the non-deactivated transponder, and that the base station would display an answer thereto as a warning signal. Thus the base station may ascertain whether the transponder has actually been transposed into the idle status, and where appropriate when this has not been effected repeat the procedure in order to transpose the transponder into the desired idle status. The answer of the transponder could lie in a slightly extended realisation of a confirmation signal of the deactivation/reactivation command.

In order to obtain as little as possible erroneous displays, the base station and transponder in dialogue may repeat the deactivation procedure once or several times, and only after an unsuccessful repetition a warning signal may then be displayed.

The dialogue between the transponder and base station may also carry out an admission identification in both directions. Thus for example the transponder after ascertaining the authorisation of the base station for deactivation/reactivation with an analogous or another method, may display its authorisation, record protected data or likewise for storing or prove its correct origin (authentication).

As indicated above for the base station there are also applied the terms "read apparatus" or "reader". This term is probably allocated historically since earlier the transponder was indeed merely extracted, thus "read". Today the base stations, as described above, fulfill many functions such as for example transmitting information, receiving information, processing information etc. For this reason in the above description the more general term "base station" is preferred. For the sake of simplicity and without limiting the generality, in the subsequent description of the figures the terms "read apparatus" or "reader" are used.

BRIEF DESCRIPTION OF THE SEVERAL VIEWS OF THE DRAWINGS

Hereinafter with reference to the accompanying drawings one variant of the method according to the invention is explained. There show.

DETAILED DESCRIPTION OF THE INVENTION

Figure 1:
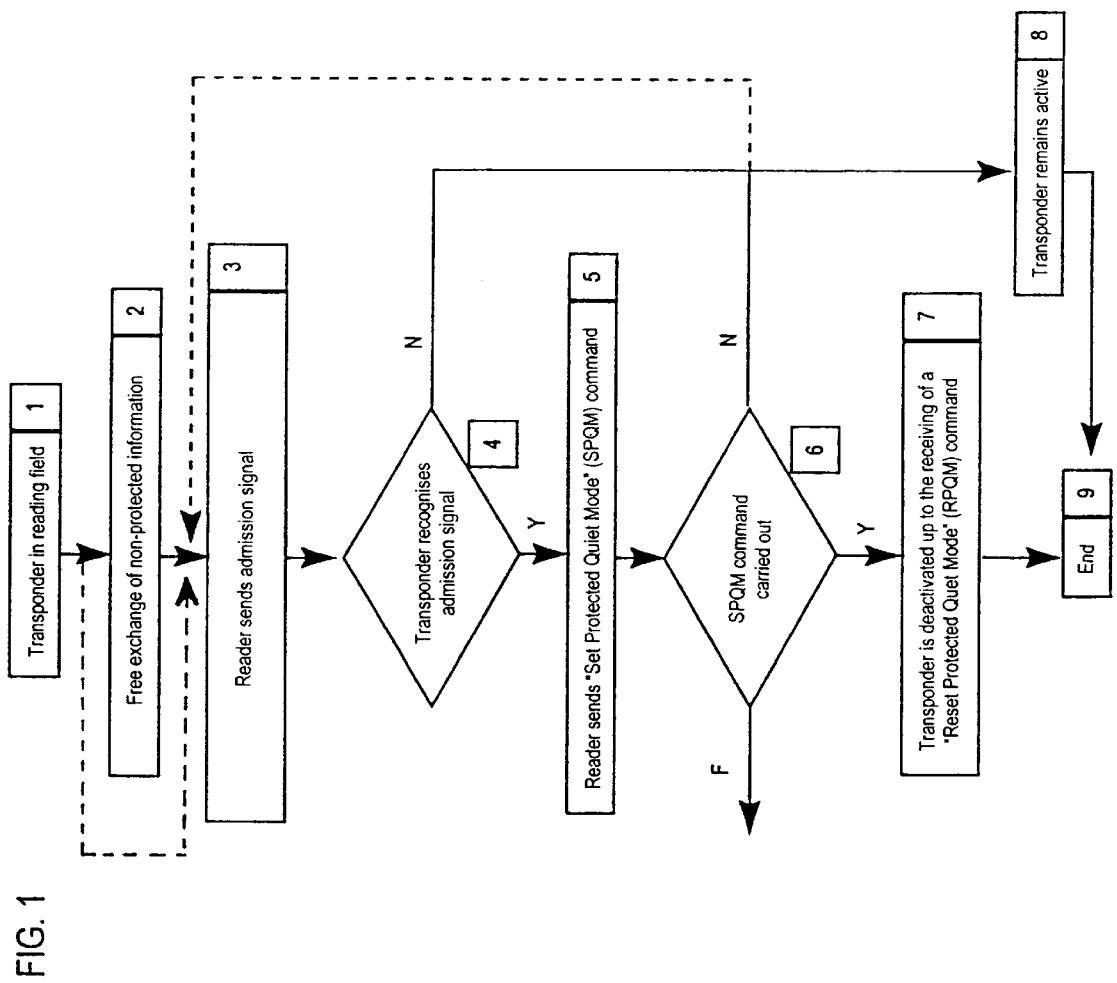
FIG. 1 a flow diagram which displays th emethod steps for deactivating the transponder and FIG. 2 likewise such a flow diagram which displays the method steps for reactivating the transponder.

The basic condition for a possible data exchange between the transponder and read apparatus is the provision that the transponder is brought into a read field of a read apparatus. This is symbolized in the flow diagram of FIG. 1 by the box 1. In the read field the transponder may be supplied with energy. In this condition the transponder and read apparatus may already exchange non-protected information in an unlimited manner. This is symbolized by the field 2. If the non-protected, optional data exchange is ended, then in step 3 the authorization of the read apparatus for deactivating the transponder is ascertained. If desired in this step 3 the transponder and read apparatus may also exchange identification signals. If the transponder ascertains the correctness of the information dialogue with the read apparatus, then the read apparatus in step 5 may transfer the command to the transponder to go into the idle condition. This set-protected-quiet-mode signal (SPQM) which deactivates the transponder may only be accepted by the transponder after it has correctly ascertained the authorization of the read apparatus. If however in step 4 the admission signal of the read apparatus has not been recognized by the transponder then the transponder remains in the active condition 8.

After the transfer of the set-protected-quiet-mode signals the read apparatus may carry out a control inquiry 6. If the read apparatus ascertains that the SPQM command is not accepted by the transponder, then the transponder remains in the active condition 8. The read apparatus which obtains the negative decision from the inquiry 6 may from now on be led into a repeat loop whereupon the set procedure is repeated from step 3 on. This repeat loop is interrupted as soon as the inquiry 6 has been successfully carried out. The read apparatus may however also count the number of effected repeats and after reaching a certain number display an error notice E.

If however the set-protected-quiet-mode signal has been correctly received, then the transponder is now in the deactivated condition and no longer answers any command of a read apparatus. Only when a reactivation by way of a reactivation command, "reset-protected-quiet-mode" (RPQM) has been effected can the transponder again be led back into the active status. After a successful run-through of the step 9 the transposing of the transponder into the idle status is ended.

For processing the first admission information with the second admission information for the purpose of ascertaining the authorisation of the read apparatus there may be applied various methods known per se. In a first variant by way of example the first admission information on the one hand obtains a random number and, on the other hand with the help a key known only to the transponder and read apparatus, a coded number set up from the random number. In the transponder then by comparing the random number with the coded number with the use of the same key and the same authorisation rule, the authorisation of the read apparatus is ascertained on account of a presence of an identical key. In a second variant the first admission information on the one hand receives a random number which is useable for a synchronisation of coding generators of the base station and of the transponder, and on the other hand, a password coded with the help of a key known to the transponder and the read apparatus, said password likewise being known to the transponder and the read apparatus. In the transponder then the authorisation of the read apparatus is ascertained on account of a presence of an identical password. The password may after the effected proof of the authorisation of the read apparatus be changeable in the transponder by the read apparatus. The key may after the effected proof of the authorisation of the base station be changeable in the transponder by the base station.

Although in the embodiment according to FIG. 1 the read apparatus and transponder according to step 2 already exchange data before the authorisation check, this is in no way compelling. Of course if desired, data which is not secret may be transferred without an admission check, however this data exchange may only be possible after the step indicated in the figure at 3, i.e. only when the transponder has received a correct admission signal from the read apparatus. In this manner in principle a data exchange only occurs after the security check.

The deactivation is effected preferably permanently and independently of the active field of the base station. For this purpose the transponder may be equipped with a non-volatile memory.

Figure 2:
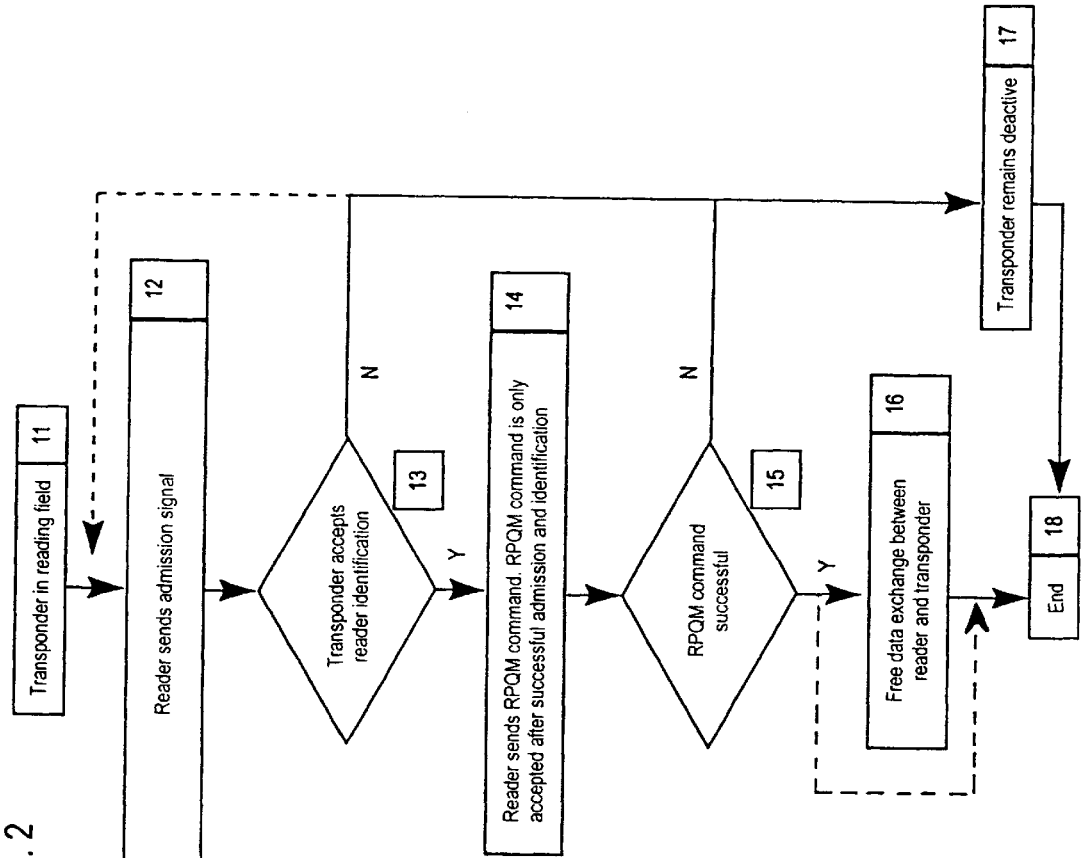

The procedure in order to convey the transponder which is situated in the idle condition, thus is deactivated, back into the active condition is represented in FIG. 2. The basic precondition is of course also here that the transponder is located in the read field of a read apparatus. If this condition 11 is fulfilled as indicated under 12 there takes place a one-sided data flow from the read apparatus to the transponder. For this the read apparatus sends first admission information for the proof of its authorisation which the transponder located in the read field checks and ascertains whether the first admission information corresponds to and fits with second admission information stored in a data memory of the transponder. This may mean that a code contained in the first admission information corresponds to a code contained in the second admission information, that the empirical processing or a number contained in the first admission information with a number contained in the second admission information according to a certain algorithm results in a certain result, etc. If desired in this step 12 the transponder and the read apparatus may also exchange identification signals.

Since with this method there takes place no activity of the transponder according to the previously mentioned definition, the transponder sends no data before it has checked the required authorisation of the read apparatus. If it does not recognise the authorisation of the read apparatus then the transponder remains deactivated (17).

After the checking 13 the read apparatus sends a command for reactivating the transponder. This reset-protected-quiet-mode signal reactivates the transponder. The precondition as previously mentioned is that the checking and exchange of the admission information has been successfully carried out. After transmitting the RPGM command 14 in step 15 the read apparatus checks the correct receiving of the command and ascertains whether the transponder is now reactivated. If this is not the case the transponder remains deactive 17 and the method is completed. Where appropriate the procedure may be repeated in a repeat loop. This means that the steps 12 to 15 are run through several times. If however the reactivation has successfully been carried out the read apparatus and transponder may freely exchange 16 any data. After completion of the data exchange the end of the method 18 is reached.

What is claimed is:

1. A method for operating a transponder which comprises a data memory and means for the contactless interaction with a base station;

wherein the transponder is brought into an active field of the base station and by the base station is respectively deactivatable, reactivatable by transferring a command signal, characterised in that before the respective deactivation, reactivation of the transponder the authorisation of the base station for respective deactivation, reactivation is checked, in that from the base station before the transfer of the command signal an admission signal which contains first admission information is transferred to the transponder, the admission signal is received by the transponder and the first admission information with second admission information stored in the data memory is processed by the transponder into authorisation information, and on account of the thus obtained authorisation information, in the transponder it is decided whether the command signal is accepted or rejected.

2. A method according to claim 1, wherein the first admission information contains on the one hand a random number and on the other hand a coded number set up from the random number with the help of a key known only to the transponder and base station so that in the transponder by comparison of the random number to the coded number the authorisation of the base station may be ascertained on account of the presence of an identical key.

3. A method according to claim 1, wherein the first admission information contains on the one hand a random number which is useable for a synchronisation of coding generators of the base station and of the transponder, and on the other hand a password which is coded with the help of a key known to the transponder and base station and which is likewise known to the transponder and the base station, so that in the transponder the authorisation of the base station may be ascertained on account of a presence of an identical password.

4. A method according to claim 3, wherein the password after an effected proof of the authorisation of the base station is changeable in the transponder by the base station.

5. A method according to claim 2, wherein the key after an effected proof of the authorisation of the base station is changeable in the transponder by the base station.

6. A method according to claim 1, wherein as first and second admission information at least one secret, not publically accessible key is used.

7. A method according to claim 1, wherein as first and second admission information asymmetrical keys and suitable computation rules are used.

8. A method according to claim 1, wherein before the transfer of the admission signal, the base station and the transponder exchange non-protected data.

9. A method according to claim 1, wherein the base station after the sending of a command signal which deactivates the transponder, emits a control signal which would be answered by the non-deactivated transponder, and the base station displays an answer thereto as a warning signal.

10. A method according to claim 9, wherein before the display of the warning signal by way of the base station the deactivation signal is repeated once again or several times and only after a failed repeat is the warning signal displayed.

11. A method according to claim 1, wherein the transponder after receiving and ascertaining the correct admission signal answers with a confirmation signal which is different from this, said confirmation signal being recognised and confirmed by the base station.

12. A method according to claim 1, wherein the transponder after an acceptance of the command signal is deactivated respectively reactivated.

13. A method according to claim 12, wherein the deactivation is effected permanently and independently of the active field of the base station.

14. A method according to claim 4, wherein:

the key after an effected proof of the authorisation of the base station is changeable in the transponder by the base station;

as first and second admission information at least one secret, not publically accessible key is used and asymmetrical keys and suitable computation rules are used;

before the transfer of the admission signal, the base station and the transponder exchange non-protected data;

the base station after the sending of a command signal which deactivates the transponder, emits a control signal which would be answered by the non-deactivated transponder, and the base station displays an answer thereto as a warning signal while before the display of the warning signal by way of the base station the deactivation signal is repeated once again or several times and only after a failed repeat is the warning signal displayed;

the transponder after receiving and ascertaining the correct admission signal answers with a confirmation signal which is different from this, said confirmation signal being recognised and confirmed by the base station;

the transponder, after an acceptance of the command signal is respectively deactivated, reactivated; and the deactivation is effected permanently and independently of the active field of the base station.

* * * * *

UNITED STATES PATENT AND TRADEMARK OFFICE
CERTIFICATE OF CORRECTION

PATENT NO. : 6,753,759 B2
DATED : June 22, 2004
INVENTOR(S) : Peter Stegmaier et al.

It is certified that error appears in the above-identified patent and that said Letters Patent is hereby corrected as shown below:

<u>Title page,</u>
Item [57], ABSTRACT,
Line 14, "while" should read -- whilst --;

<u>Column 3,</u>
Line 64, "th emethod" should read -- the method --.

Signed and Sealed this

Twenty-first Day of June, 2005

JON W. DUDAS
*Director of the United States Patent and Trademark Office*